(12) United States Patent (10) Patent No.: US 8,300,083 B2
Baker et al. (45) Date of Patent: Oct. 30, 2012

(54) POSITION RELATIONSHIPS ASSOCIATED WITH IMAGE CAPTURING DEVICES

(75) Inventors: Henry Harlyn Baker, Palo Alto, CA (US); Zeyu Li, Palo Alto, CA (US); Robert Samuel Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1501 days.

(21) Appl. No.: 11/880,396

(22) Filed: Jul. 20, 2007

(65) Prior Publication Data

US 2009/0021614 A1 Jan. 22, 2009

(51) Int. Cl.
*H04N 7/00* (2011.01)
(52) U.S. Cl. ............................................ 348/36; 348/39
(58) Field of Classification Search ...................... 348/36, 348/47, 48, 262
See application file for complete search history.

(56) References Cited

U.S. PATENT DOCUMENTS

| | | | | |
|---|---|---|---|---|
| 6,100,929 | A * | 8/2000 | Ikeda et al. | 348/262 |
| 6,961,079 | B2 * | 11/2005 | Kaylor et al. | 348/49 |
| 7,199,348 | B2 * | 4/2007 | Olsen et al. | 250/208.1 |
| 7,307,654 | B2 * | 12/2007 | Chang | 348/218.1 |
| 7,714,892 | B2 * | 5/2010 | Clark et al. | 348/208.99 |
| 2002/0036649 | A1 * | 3/2002 | Kim et al. | 345/633 |
| 2005/0117015 | A1 * | 6/2005 | Cutler | 348/38 |
| 2005/0185047 | A1 * | 8/2005 | Hii | 348/36 |
| 2007/0285550 | A1 * | 12/2007 | Son | 348/335 |
| 2008/0106608 | A1 * | 5/2008 | Clark et al. | 348/208.99 |
| 2008/0143821 | A1 * | 6/2008 | Hung et al. | 348/36 |
| 2008/0143835 | A1 * | 6/2008 | Abe et al. | 348/148 |

\* cited by examiner

*Primary Examiner* — Minh-Chau Nguyen

(57) ABSTRACT

A method for determining a plurality of spatial relationships associated with a plurality of image capturing devices is disclosed. In one embodiment, the present method acquires sets of a plurality of source images from a plurality of image capturing devices. The present method then determines a plurality of transforms for each such set of source images for combining the acquired source images into a plurality of seamless images. The present method then determines a plurality of relative positions associated with the plurality of image capturing devices based on the plurality of transforms The present method then determines a plurality of spatial relationships associated with the plurality of image capturing devices based on the transforms and plurality of relative positions associated with the plurality of image capturing devices.

14 Claims, 17 Drawing Sheets

Proof of Theorem 1: A ROPI matrix has unit second singular value.

Defining $M^T M = I + xy^T + y(x^T + x^T x^T y^T) \equiv I + B$, it is sufficient to prove that the matrix $M^T M$ has unit singular value, and at the same time that $B$ is an indefinite matrix. This means the 3 singular values of $M^T M$ will be interlaced around 1.

First, we can verify that the matrix A has a singular value equal to 1 by construction: we define a vector $w \in R^3$, which satisfies: $w \perp y$ and $w \perp (x + x^T xy)$. Thus, $$(M^T M)w = w + xy^T w + y(x^T + x^T x^T y^T)w$$
$$= w + 0 + 0 = w$$

Hence $(1, w)$ is one eigen-pair of $M^T M$, and 1 is the singular value of $M$. □

Second, we want to prove that $B$ has the eigenvalues: $(\lambda_1, 0, \lambda_2)$, where $\lambda_1 > 0$ and $\lambda_2 < 0$. It's easily to verify that $B$ is a rank-two matrix. Now we have to prove that there exist non-zero vectors $a$ and $b$, such that: $a^T Ba > 0 > b^T Bb$. We rewrite $B$ as:

$$B = yy^T + xy^T + yx^T + xx^T - xx^T = (y+x)(y+x)^T - xx^T$$

Choosing a vector $a \perp x$, but $a$ not perpendicular to $(y+x)$, then:

$$a^T Ba = a^T(y+x)a - 0 > 0$$

If we pick a vector $b \perp (y+x)$, but $b$ is not $\perp$ to $x$, then we have:

$$b^T Bb = 0 - b^T xx^T a < 0$$

If we pick a vector $c \perp x$ and $c \perp (y+x)$, simultaneously, then we have, $$c^T Bc = 0$$

Thus we can claim that $B$ is indefinite. □

FIG. 10

POSITION RELATIONSHIPS ASSOCIATED WITH IMAGE CAPTURING DEVICES

TECHNICAL FIELD

Embodiments of the present invention pertain to methods and systems for image processing.

BACKGROUND ART

Some conventional image acquisition systems have the capacity to combine individual images for the purpose of producing composite images that detail an enlarged field of view. These image acquisition systems use methodologies that rely upon the capture of the images by one or more cameras. In order to combine the images that are captured, some conventional systems rely on the overlap of image regions of the captured source images.

The quality of a composite image is constrained by the imagery that is used in its creation. It should be appreciated that the resolution involved and the number of viewpoints that are considered are important factors that impact the creation of composite images. The greater the resolution and number of viewpoints provided the greater the spatial resolution of the resultant composite image. While digital still cameras are reaching mega-pixel dimensions at nominal cost (e.g., providing increasingly high resolution images), the spatial resolution provided by digital video systems lags far behind that offered by digital still cameras.

Although multi-viewpoint camera systems have been in existence since the dawn of photography, most conventional image analysis is based upon single camera views. It should be appreciated, that although stereo and moving video cameras can provide more viewpoints, the actual utilization of simultaneous acquisition from a large number of perspectives remains rare as it relates to such imaging systems. A principal reason for the low resolution and limited number of viewpoints that are conventionally employed in personal computer (PC) imaging systems is the high bandwidth necessary to support sustained data movement from numerous video sources. The data is provided to a computer memory and, eventually, to a display, at the conventional supply rate of 30 frames per second. Moreover, access to high-bandwidth multiple-stream video has been limited.

Bandwidth issues arise at the display end of conventional imaging systems as well. This is because moving large amounts of digital video severely taxes current PC architectures. Real-time display of these data requires a judicious mix across peripheral component interconnect (PCI), PCI-X, and accelerated graphics port (AGP) buses distributed over multiple display cards.

The creation of composite images (e.g., mosaicking) involves combining source images captured from a plurality of camera viewpoints. The source images are derived from viewpoint associated video streams and are used to form the composite image. A conventional approach to the creation of composite images involves finding points that correspond in the contributing images and computing stitching homographies that relate their perspectives. This approach derives from the situation where images are collected from arbitrary positions, such as in hand held capture. There, the features for deriving each homography must come from the acquired images themselves. If the camera views share a center of projection, the features can be chosen from anywhere in the overlapping images and their homographies will be valid throughout the scene viewed. However, when they don't share a projection center, the features must be collected from a shared observation plane and the homography may only produce seamless composite images for imagery in that plane.

For the reasons outlined above, conventional systems that composite images are relegated to low-resolution implementations that employ a limited number of viewpoints. The limited number of viewpoints provides a limited capacity to produce panoramas from acquired images that have high spatial resolution. The performance of conventional systems is further limited by their reliance on the use of overlapping image data to generate homographies. The requirement that the source images used to compose a composite image overlap decreases the size of the view angle that can be imaged as it prevents the imaging of non-overlapping views that can cover a wider measure of space.

DISCLOSURE OF THE INVENTION

A Method for determining a plurality of spatial relationships associated with a plurality of image capturing devices is disclosed. In one embodiment, the present method acquires sets of a plurality of source images from a plurality of image capturing devices. The present method then determines a plurality of transforms for each such set of source images for combining the acquired source images into a plurality of seamless images. The present method then determines a plurality of relative positions associated with the plurality of image capturing devices based on the plurality of transforms The present method then determines a plurality of spatial relationships associated with the plurality of image capturing devices based on the transforms and plurality of relative positions associated with the plurality of image capturing devices.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 10 is a proof showing that the second singular value of a rank one perturbation of identity (ROPI) matrix has a value equal to unity in accordance with embodiments of the present invention.

The drawings referred to in this description should not be understood as to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the following discussion the term "composite image" is intended to refer to an image that is formed from two or more acquired or captured images. Moreover, the term "mosaicking" is intended to refer to the process of creating seamless composite images. The term "source image" is intended to refer to images from which a composite image is formed. The term "image capturing device" or "imager" is intended to refer to a component of a camera system that captures images. The term "homography" is intended to refer to a mathematical object that relates the perspectives of source images. In one embodiment, these homographies are determined by constraints shared by source images and are utilized to combine those source images seamlessly.

Figure 1A:
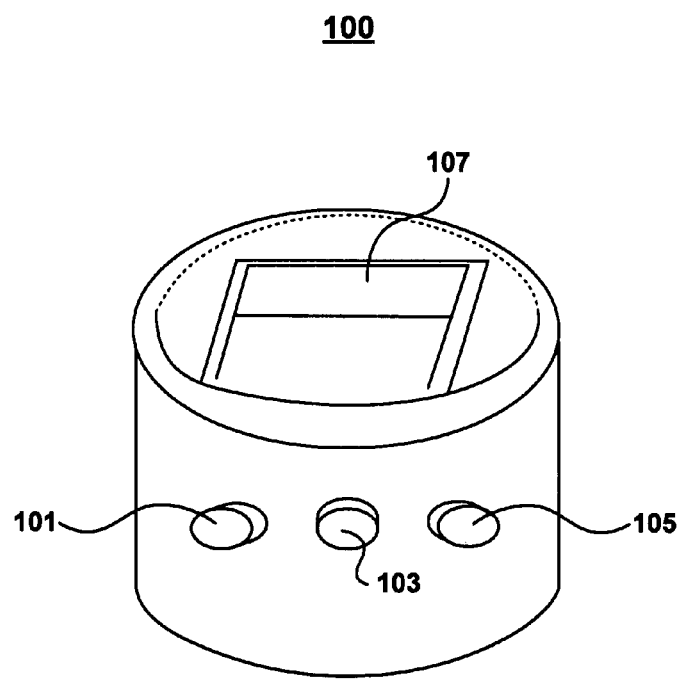
FIG. 1A shows a camera system that produces seamless composite images without requiring overlap of the source images that constitute each composite image according to one embodiment of the present invention.
Figure 1B:
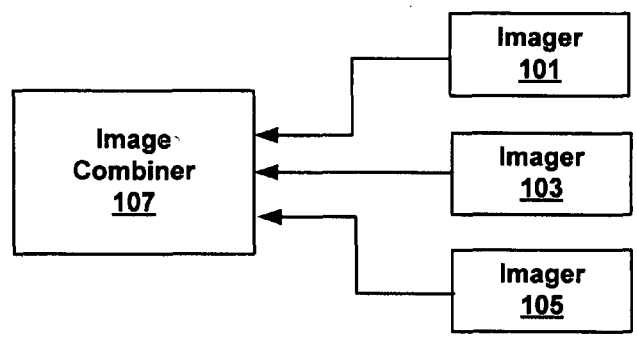
FIG. 1B shows a block diagram of a camera system that produces seamless composite images without requiring overlap of the source images that constitute each composite image according to one embodiment of the present invention.

System for Producing Seamless Composite Images According to One Embodiment of the Present Invention FIG. 1A shows a camera system 100 that produces seamless composite images without requiring overlap of the source images that constitute each composite image according to one embodiment of the present invention. A block diagram 100A of camera system 100 is shown in FIG. 1B. In the present embodiment, the composite images are formed by combining a plurality of source images that are captured using a plurality of imagers according to one embodiment of the present invention. In the FIG. 1A embodiment, camera system 100 includes imagers 101-105 and image compositor 107.

Imagers 101-105 capture respective source images from the respective viewpoints of the imagers 101-105. The captured source images are combined to form seamless composite images (e.g., virtual images, mosaic images etc.). The composite images are created using source images that correspond to respective image streams that are generated by the respective imagers 101-105. The composite images that are created using the captured images can yield a panoramic view that can not be derived from any of the individual views.

While one embodiment of the system may have a common plane arranged front to-parallel to the camera views, in which case the individual lenses of the imagers will all be focused at about the same distance. It should be appreciated that the focal distances of the lenses of imagers 101-105 may be set independently to accommodate an orientation of a common plane that is not orthogonal to their general view direction. Although camera system 100 is depicted in FIG. 1 as including three imagers, other arrangements that include other numbers of imagers can be employed according to exemplary embodiments. In one embodiment imagers can be employed as a part of a pan tilt zoom (PTZ) imaging system that provides frame selection within the composite image.

In exemplary embodiments, the relationship of captured (e.g., acquired) images can be fixed before capture. When the relationship of captured images is fixed before capture, dynamic registration can be replaced by once only analysis. In one embodiment, imagers 101-105 are configured beforehand for a desired panorama-shaped image, and the known relationship of the imagers 101-105 is used to repeatedly compose the frame in real time at minimal central processing unit (CPU) cost.

Combiner 107 combines the source images that are acquired by imagers 101-105 to produce a seamless composite image (e.g., virtual image, mosaic image etc.). In one embodiment, the composite image is created in a manner that does not require overlap of an image region of the acquired image. In one embodiment, this is accomplished by using line features to combine the source images (see discussion made with reference to FIG. 3). The line features enable the combiner 107 to identify relationships that exist among the source images that can be utilized to combine the source images seamlessly.

Figure 1C:
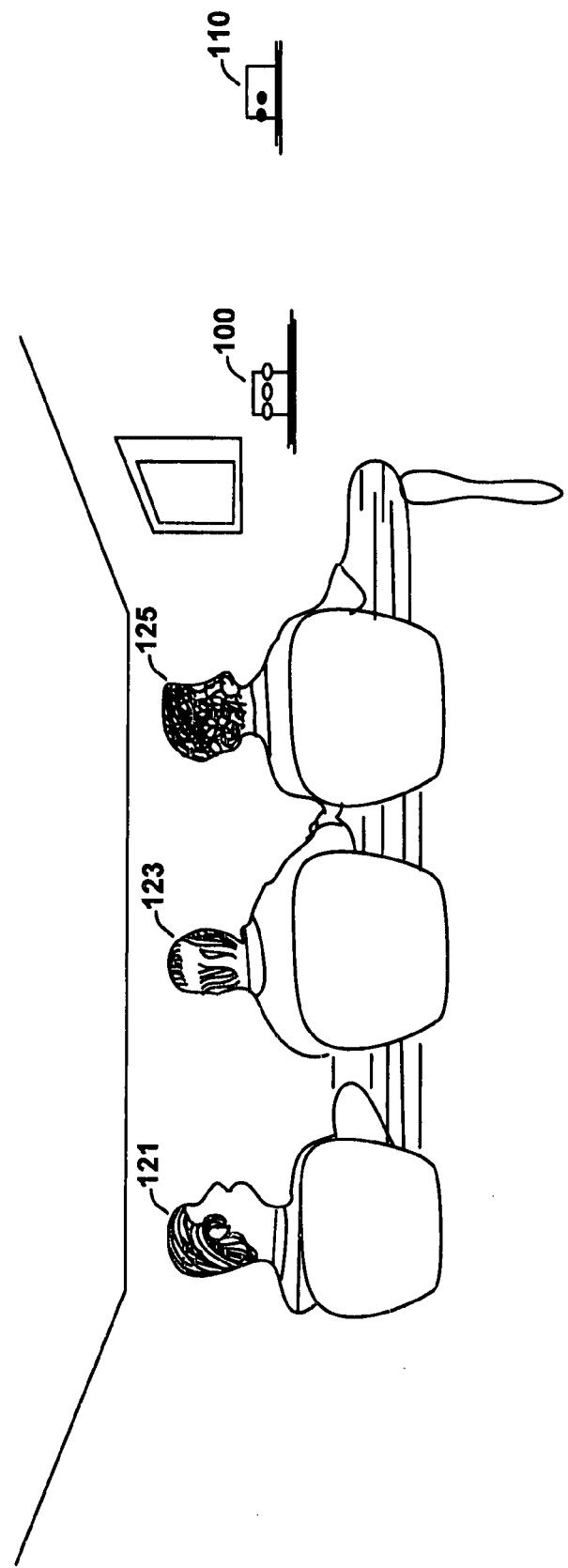
FIG. 1C illustrates the imaging of seated conferees participating in a video conferencing session using a camera system for producing seamless composite images without requiring overlap of acquired images according to one embodiment of the present invention.

In operation, camera system 100 can be situated so that objects that are desired to be imaged are located within its imaging plane, e.g., plane of focus POF, shared or common observation plane, etc., (see discussion made with reference to FIG. 1C). In one embodiment, a plurality of imagers is configured to capture respective source images from respective portions of the shared observation plane. In the present embodiment, seamless composite images are formed by combining the source images using a resampling mechanism that utilizes homographies based on line features.

It should be appreciated that the size of the view angle that can be imaged by camera system 100 is significantly increased as compared to conventional systems because it does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are provided. Consequently, greater spatial resolution can be achieved with less additional bandwidth.

In one embodiment, the line features that are used can be visible in (and in some cases extend across) several images and can provide correspondences between the images that eliminates the necessity of having significant overlapping of the source images from which a composite image is formed (see discussions made herein).

In one embodiment, because the presence of overlap can be limited to operations that ensure the continuity of the composite image, the presence of overlap can be minimized. Moreover, because a series of source images that do not overlap can cover a wider angle than the same number of similarly formatted source images that do overlap, the number of imagers that are necessary to cover space desired to be imaged can be reduced. This feature of exemplary embodiments of the present invention minimizes the number of imagers that is required to construct a desired panoramic view. It should be appreciated that this maximizes both the usefulness of acquired pixels and the efficiency of the image processing (capacity to image a wider angle using fewer imagers).

In one embodiment, the creation of seamless composite images (e.g., video mosaicking) can be employed to capture panoramic views (e.g., wide angled and unbroken views) of video conferencing participants for presentation at remote sites. In such embodiments the observations from several multi-viewpoint imagers are combined to simulate the performance of a much costlier mega-pixel video camera. The result can be reformatted to a desired panoramic view shape.

Figure 1D:
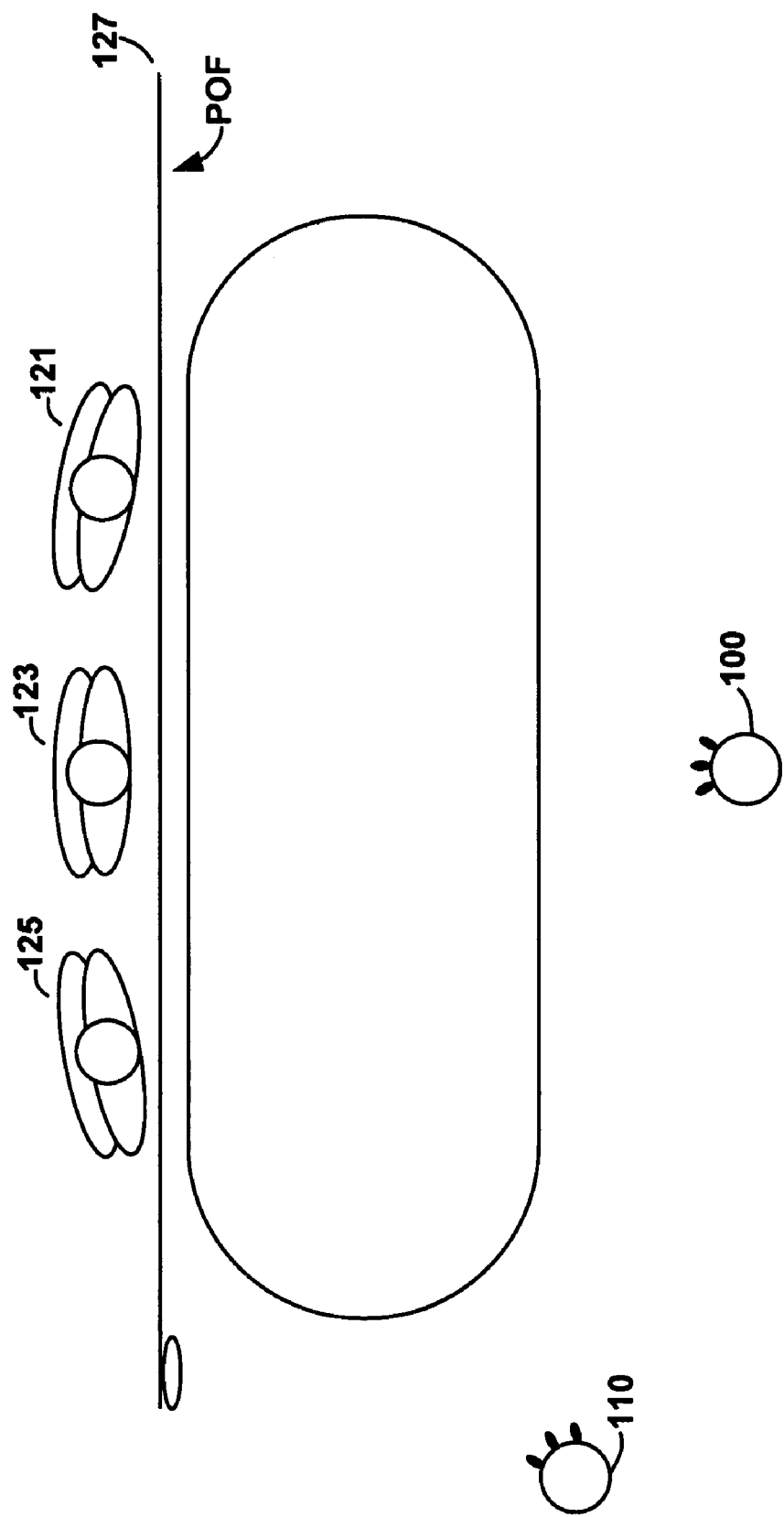
FIG. 1D is a top perspective view of conferees shown in FIG. 1B and illustrates the positioning of conference participants in the imaging plane of camera system according to one embodiment of the present invention.

FIG. 1C illustrates the imaging of seated conferees participating in a video conferencing session using a camera system 100 for producing seamless composite images without requiring overlap of acquired images. In FIG. 1C camera systems 100 and 110 are placed where seated conferees 121, 123 and 125 are located within their imaging planes, e.g., plane of focus (POF), (see reference 127 in FIG. 1D) of camera systems 100 and 110 as is illustrated in FIG. 1D. FIG. 1D is a top perspective view of conferees 121, 123 and 125 shown in FIG. 1C and illustrates an exemplary positioning of conference participants for imaging in the imaging plane 127 of camera system 100. In one embodiment, imaging plane 127 is formed from a combination of the image planes of the imagers that are a part of camera system 100 and thus represents the common image plane of the imagers that are employed in camera system 100. In one embodiment the focal distances of the lenses of the imagers are set independently to accommodate an orientation of the common plane that is not orthogonal to their general view direction.

Figure 1E:
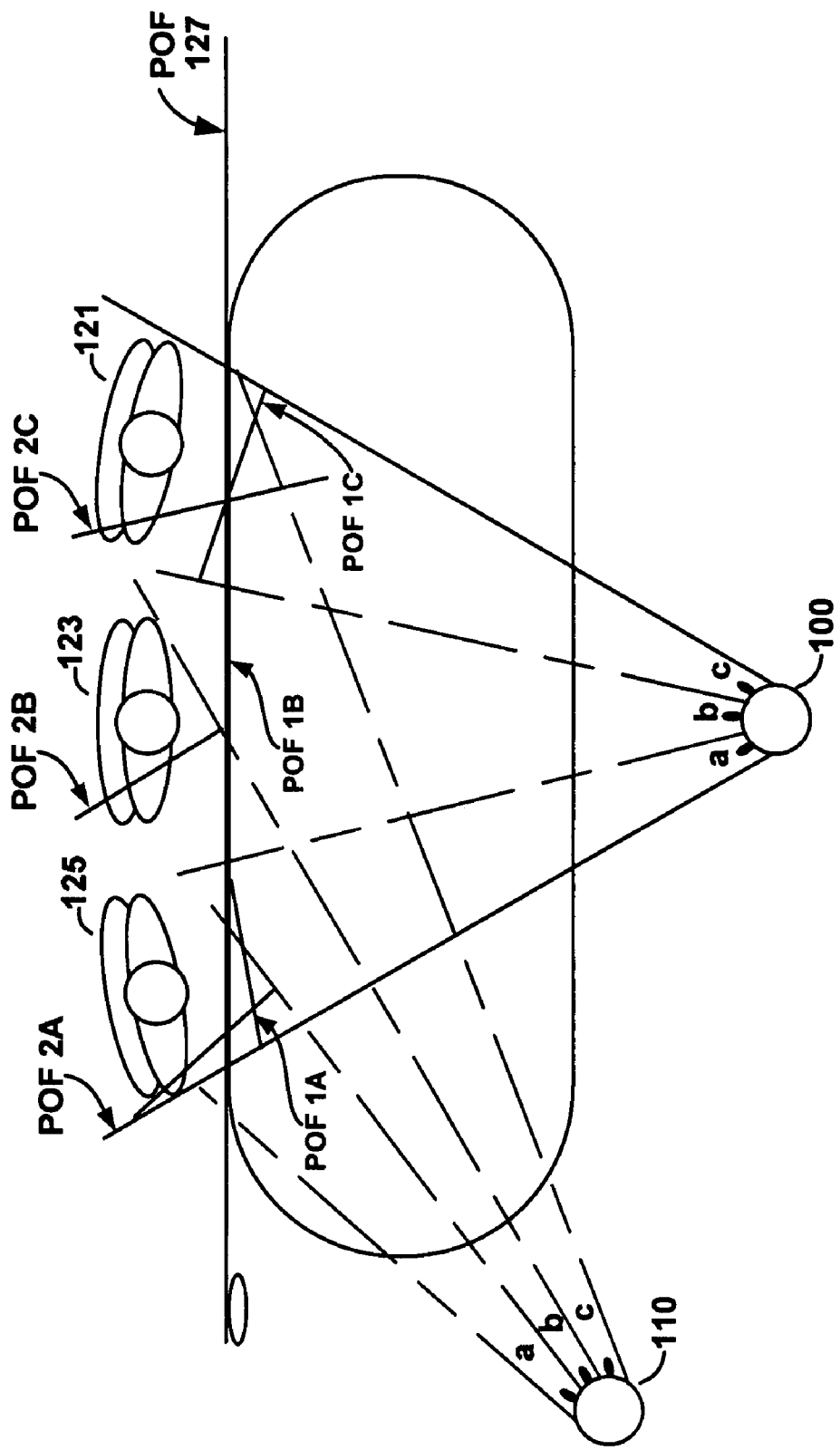
FIG. 1E illustrates how a common image plane is formed from the planes of focus of a plurality of imagers that are employed by multi-imager camera system according to one embodiment of the present invention.

FIG. 1E illustrates how a common image plane (e.g., 127) is formed from the POFs of a plurality of imagers (e.g., 101, 103 and 105 in FIG. 1A) that are a part of the multi-imager camera system 100. Referring to FIG. 1E, the image planes (POF1, POF2 and POF3) of the imagers that are employed in camera system 100 provide a common image plane 127. As mentioned above, for imaging purposes, the camera system 100 is positioned so that conferees are located in common image plane 127.

Figure 2:
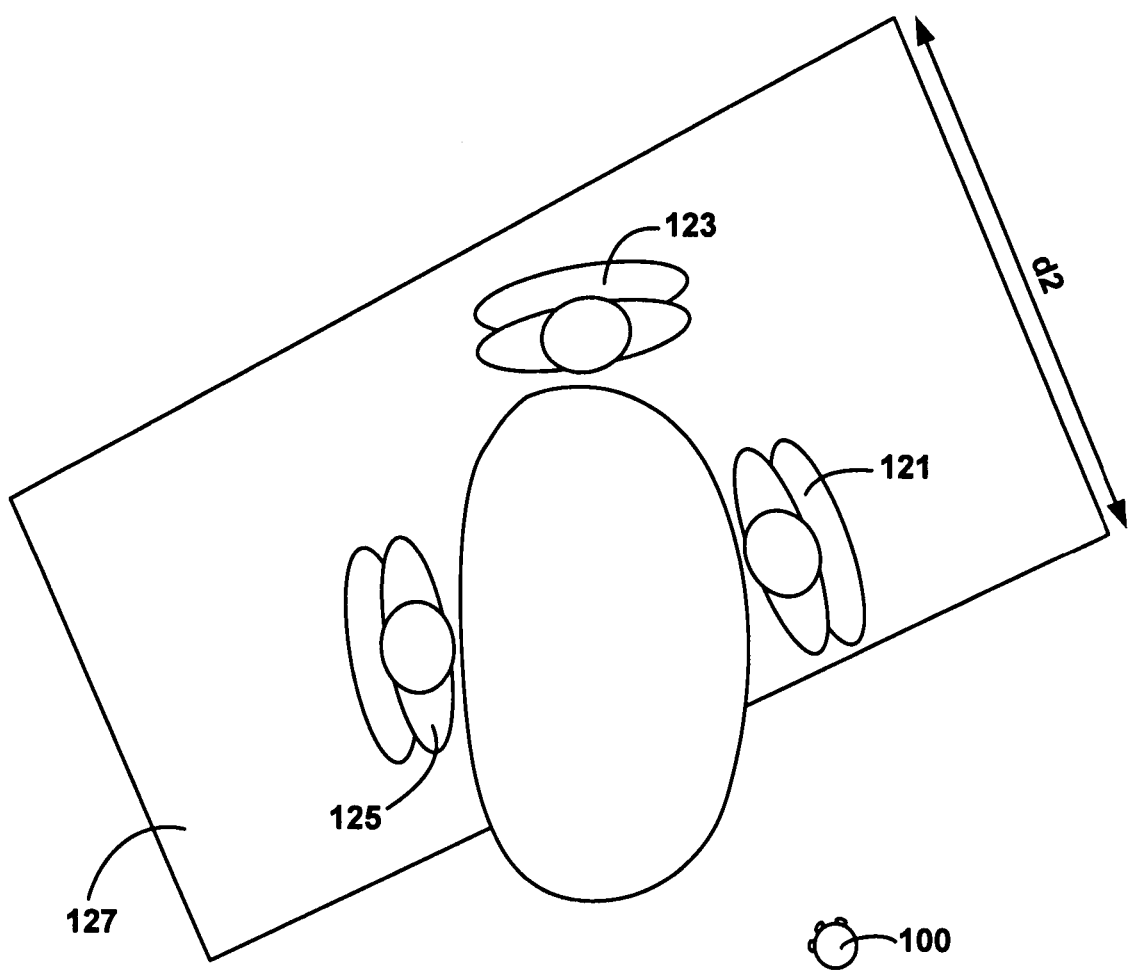
FIG. 2 is a top perspective view of conferees shown in a more circular configuration that that of FIG. 1C and illustrates the positioning of conference participants in a deeper imaging plane of the camera system according to one embodiment of the present invention.

FIG. 2 shows the conferees situated around a table. Their position might appear to make the homography invalid, since they do not lie in or near a plane—their separation is indicated as dZ (depth of focus). Nevertheless, this arrangement will be acceptably handled by the homography. If the centers of projection of the individual imagers of camera system 100 are sufficiently near each other.

The Use of Line Features

Figure 3:
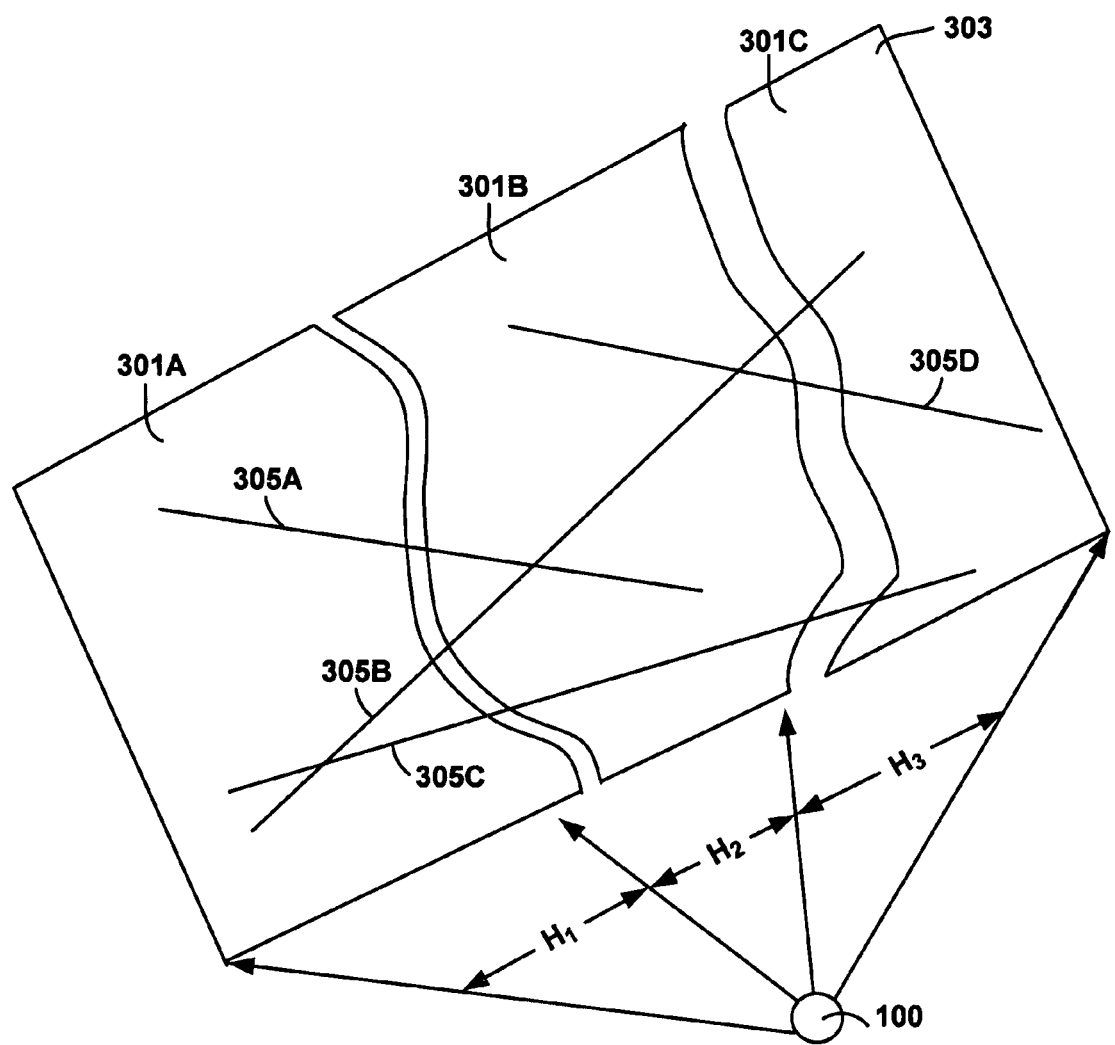
FIG. 3 shows source images captured by a multi-imager camera system and line features that are used to relate the source images according to one embodiment of the present invention.

FIG. 3 shows source images captured by a multi-imager camera system and line features that are used to relate the source images according to one embodiment of the present invention. FIG. 3 shows source images 301A-301C, calibration plane 303 and line features 305A-305D. FIG. 3 illustrates the use of line features 305A-305D which are projected into calibration plane 303 and used to identify relationships between source images 301A-301C. The relationships are used to generate a respective homography H1, H2 and H3 for respective source images 301A-301C.

It will be obvious to those skilled in the art that there is a certain number of such lines that must be observed and certain relations of independence that must be satisfied in order for the homography estimation process to be valid.

In exemplary embodiments, using line features 305A-305D, high-resolution wide-angled panorama views can be constructed from a minimum number of low-resolution imagers (e.g., 101-105 in FIG. 1). In such embodiments, an homography H relating two source images I and I' (for instance 301A and 301B) with corresponding points x and x' and lines l and l' is given by the equations:

$$x' = Hx$$

$$l' = H^{-1}l$$

Referring again to FIG. 3, since in one embodiment lines (e.g., line features 305A-305D) can be employed that are visible in (and in some cases extend across) several source images (e.g., 301A-301C), correspondences among source images 301A-301C can be identified without significant source image overlap. Since overlap is only needed for continuity of the resulting composite image, the need for overlap can be minimized (to zero) and the number of imagers (e.g., 101-105 in FIG. 1) needed to construct a desired panoramic view is reduced. In such embodiments, the usefulness of acquired pixels is maximized while processing is made more efficient.

It should be appreciated that the size of the view angle that can be imaged by a camera system (e.g., 100 in FIG. 1) employing the above described line feature image compositing methodology is significantly increased as compared to conventional systems because image overlap is not required in order to produce seamless composite images. The larger view angle allows the imaging of panoramas that cover a wider measure of space. For this reason, by employing the herein described methodology, a plurality of lower resolution imagers can be used to produce panoramas that have increased spatial resolution for the number of imagers that are provided. Consequently, greater spatial resolution can be achieved with less additional bandwidth.

It should be appreciated that lines are similar to points in that collinear lines are like lines of coincident points, parallel lines are like lines of collinear points, and a minimum of four observations in general position are needed to form an homography with eight degrees of freedom (in a preferred embodiment, many more can be used in order to improve precision and stability). However, the extended spatial support of line based solutions presents an added advantage over point-based solutions in that localization of a line is more robust. More specifically, when presented with the same number of observations of lines and points, better estimates can be generated using the lines.

Line Based Homographies

Figure 4A:
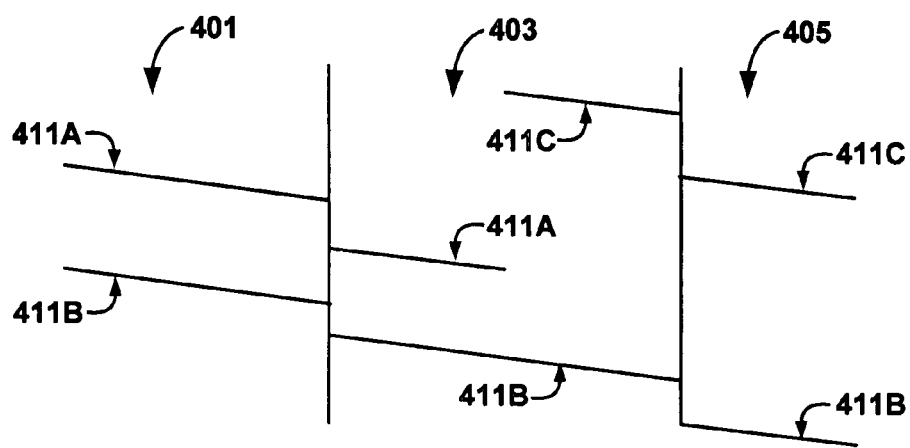
FIG. 4A illustrates the formation of a seamless composite image using line based homographies according to one embodiment of the present invention.
Figure 4B:
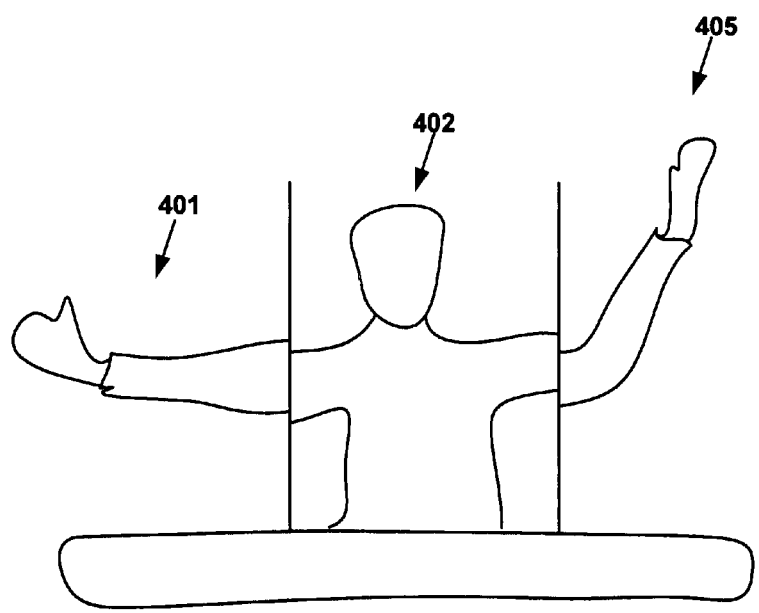
FIG. 4B illustrates the formation of a seamless composite image using line based homographies according to one embodiment of the present invention.
Figure 4C:
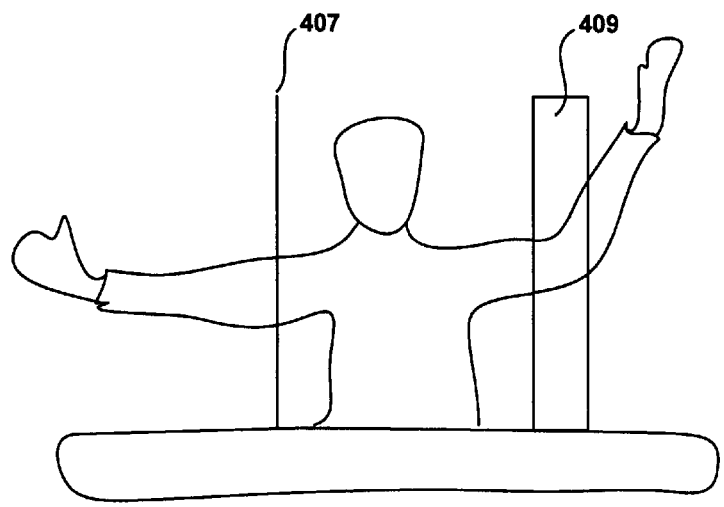
FIG. 4C illustrates the formation of a seamless composite image using line based homographies according to one embodiment of the present invention.
Figure 4D:
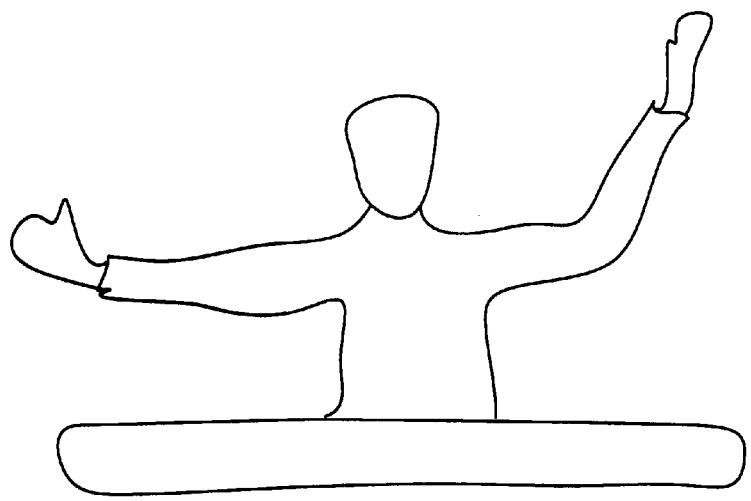
FIG. 4D illustrates the formation of a seamless composite image using line based homographies according to one embodiment of the present invention.

FIGS. 4A-4D illustrate the formation of a seamless composite image using line based homographies according to one embodiment of the present invention. FIG. 4B shows source images 401, 403 and 405 that contribute to the desired seamless composite image (e.g., mosaic) shown in FIG. 4D and the line features 411 (shown in FIG. 4A as line features 411A-411C) that relate the perspectives of source images 401, 403 and 405 from which homographies of source images 401, 403 and 405 are computed. FIG. 4C shows a view of the composite image without blending (unblended regions 407 and 409 are shown in FIG. 4B).

In one embodiment, homographies can be generated by: (1) projecting line features that are detectable by an imager array (see discussion made with reference to FIG. 3), (2) correcting the line features for lens distortion, (3) estimating line features using a least squares fitter, and (4) passing the line features to a homography solver. The homography from one imager (e.g., 101-105 in FIG. 1) to another can be derived as the transpose inverse of the solution determined by treating the homogeneous representation of each line as if it were a point and solving for the point-wise homography (see equation above).

It should be appreciated that in one embodiment lens correction and luminance and color adjustments are made to bring images into agreement on color and, brightness, and to correct for lens distortions. In such embodiments the geometric correction is part of the re-sampling, and the color and brightness corrections make the content photometrically more correct.

Alternately, the line based homography can be determined directly from the linear estimates. In one embodiment, having the homographies that relate one imager to another, allow the homographies to be chained together to determine the transforms that bring any involved imager into a global frame of reference. Initially, the global frame may be chosen as one of the imager frames (for instance the center imager). Subsequently, a derived global frame may be constructed that encompasses them all.

In one embodiment, a re-sampling mechanism (e.g., lookup table etc.) that contains pre-computed values that are used to compose a composite image from its contributing components is constructed after an output size within the dataset corresponding to a constructed frame is determined. The table can carry bilinear interpolation indices and weights that are used to compose each destination pixel. These indices map pixels that make up the resultant composite image through each imager homography and reposition the mapped point to account for any observed lens-induced curvatures. In one embodiment, the vast majority of pixels can be seen by only one imager. In cases where several imagers see a pixel, the contributions of the pixels can be blended. In one embodiment, the metric employed is linear interpolation (regions of overlap are determined, and the pixel weights of the contributing pixels seen by respective imagers are computed by distance from that source image's boundary).

CPU AND GPU BASED OF PRODUCTION OF SEAMLESS COMPOSITE IMAGES ACCORDING TO ONE EMBODIMENT

CPU Based Production of Seamless Composite Images

Figure 5:
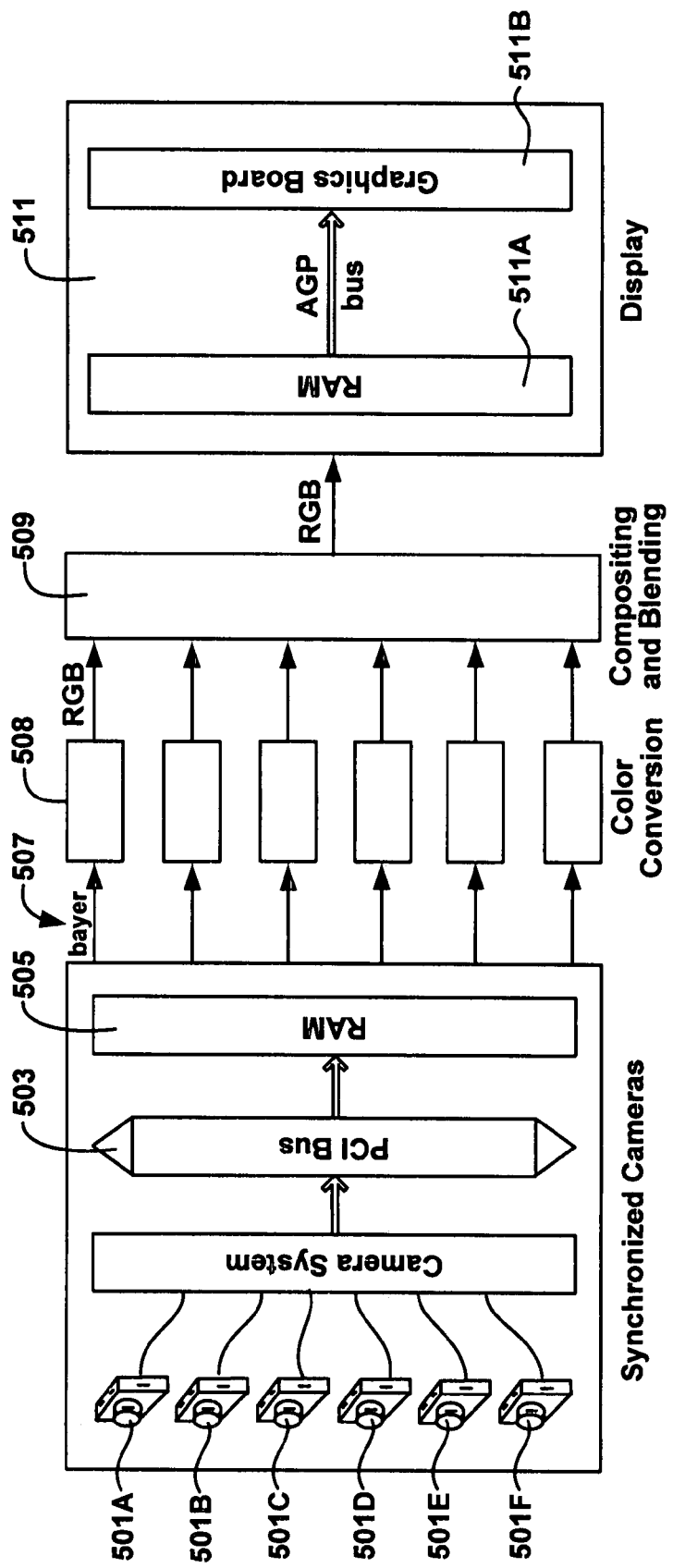
FIG. 5 shows an exemplary dataflow diagram illustrating the flow of video data where six video imagers are employed in a multi-imager camera system that employs central processing unit (CPU) processing according to one embodiment of the present invention.

FIG. 5 shows an exemplary dataflow diagram illustrating the flow of video data where six video imagers are employed in a multi-imager camera system that employs CPU processing according to one embodiment of the present invention. FIG. 5 illustrates a beneficial bandwidth and computation distribution scheme where parallelized CPU processing is employed. In the FIG. 5 embodiment, synchronized imagers 501A-501F generate parallel streams of video data that are delivered to RAM storage units 505 via a bus 503 (e.g., PCI etc.). Subsequently, the digital video 507 receives parallelized color conversion 508 and compositing and blending (if necessary) 509 and is delivered to a display 511 that includes RAM storage units 511A and graphics board 511B.

In moving large amounts of digital video 507 current PC architectures are severely taxed. Real-time display of these data requires a judicious mix across peripheral component interconnect (PCI), PCI-X, and accelerated graphics port (AGP) buses distributed over multiple display cards, which present significant bandwidth challenges. In one embodiment, with these bandwidth issues in mind, a distributed parallelized processing scheme such as is illustrated in FIG. 5 can be employed that is enabled both by the multi-imager system performance exhibited by exemplary embodiments of the present invention and by the advanced graphics processing units (GPUs) that are available for modern PCs (see discussion below).

In one embodiment, the compositing of images can be performed by a PC processor that uses a re-sampling mechanism (e.g., lookup-table etc). As discussed above, computation can be parallelized to exploit multiple processors. In this embodiment, re-mapping can be designed to scale based on numbers of camera pixels and size of display.

GPU Based Production of Seamless Composite Images

Figure 6:
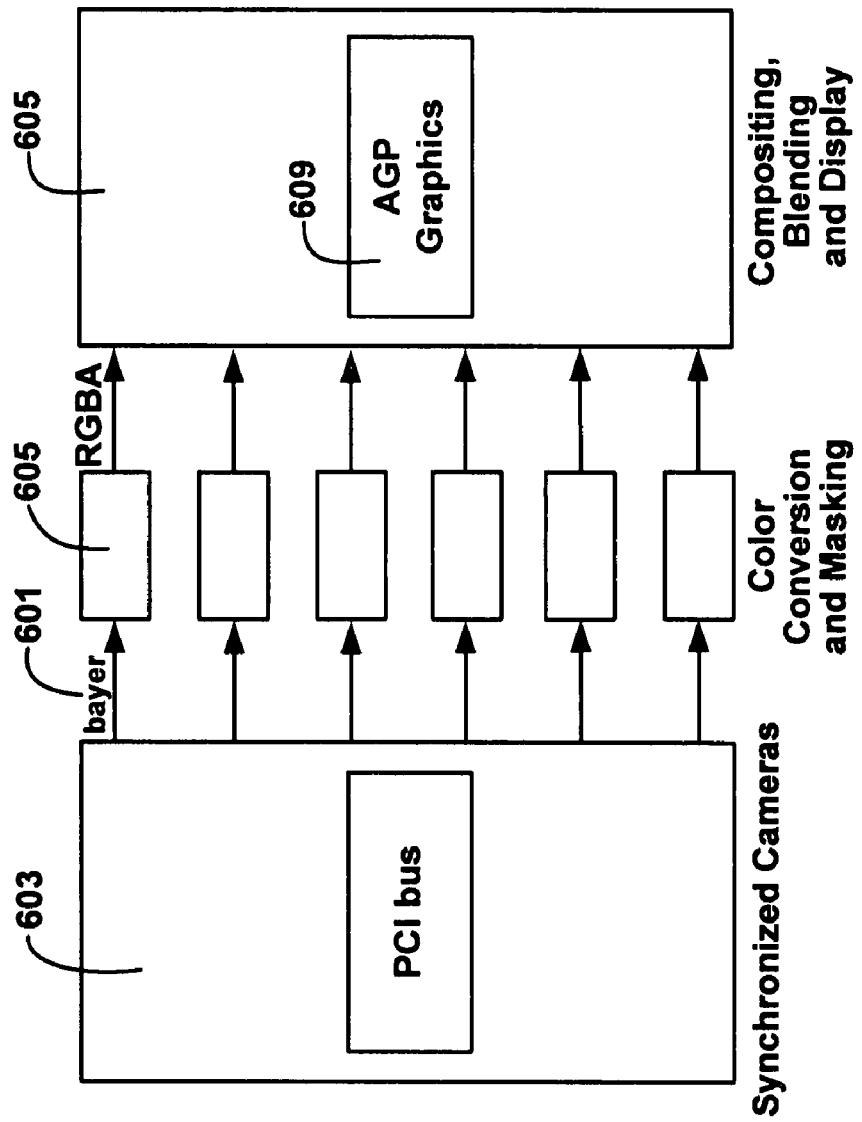
FIG. 6 illustrates an application of graphics acceleration according to one embodiment of the present invention.

FIG. 6 illustrates an application of graphics acceleration according to one embodiment of the present invention. FIG. 6 shows blocks that represent the video streams 601, which are generated by synchronized imagers, a data bus 603, color conversion operations 605, compositing/blending operations 607 and AGP graphics hardware 609. FIG. 6 illustrates an embodiment where compositing and blending operations 605 (e.g., mosaicking operations) are performed by the AGP graphics hardware 609 and preceded by CPU color conversion operations 605.

In the FIG. 6 embodiment, the use of graphics processing can be exploited for use in panorama building. In this embodiment, for display oriented tasks, re-sampling vectors can be treated as static image geometry and the streaming video can be treated as dynamic textures. In such embodiments, the static image geometry can be downloaded (reshaping the source images), allowing compositing and blending operations to be performed by the AGP graphics hardware 609 (e.g., GPU hardware). The subsequent video is streamed to the display.

In the FIG. 6 embodiment, GPU "mosaicking" can be performed considerably faster than CPU "mosaicking." In such embodiments, the CPU's task can be solely one of color converting the camera video from one format to another, and then passing the imagery to the graphics card. In another embodiment the processor load can be reduced even further by performing color re-sampling in the GPU rather than converting video into RGB before sending it to the graphics board. In this embodiment, bus bandwidth load can also be reduced which is an important consideration when cameras and displays share resources with other activities.

Another advantage of the GPU approach to "mosaicking" is that the cost of producing the composite image is independent of its size. By contrast, high costs are incurred for large images when CPU-based compositing is employed. In one embodiment, if the video stream is sent to a handheld device or ramped up for a very large display surface, the different scalings can be handled transparently in the graphics card.

In one embodiment, the graphics processing units (GPUs) of a PC can be used for the re-sampling to provide better scaling. In this embodiment, a beneficial computational use of available graphics processing is made. It should be appreciated that the use of graphics processing can be useful in display oriented applications.

Figure 7:
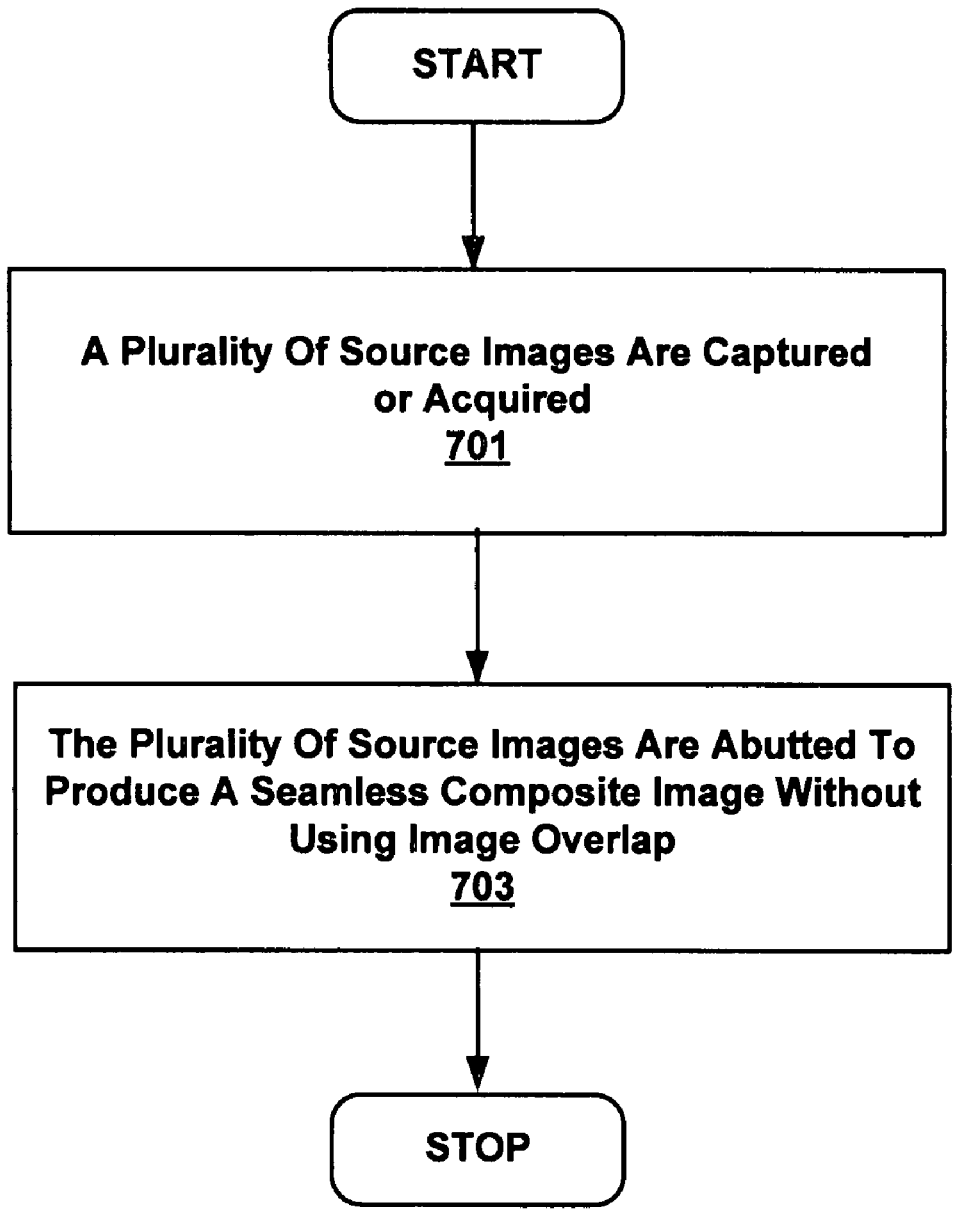
FIG. 7 shows a flowchart of the steps performed in a method of producing seamless composite images without using overlap of source images according to one embodiment of the present invention.

FIG. 7 shows a flowchart of the steps performed in a method of producing seamless composite images without using overlap of source images according to one embodiment of the present invention.

At 701, a plurality of source images are acquired (e.g., captured, imaged etc.).

At 703, the plurality of source images are combined to produce a seamless composite image. In one embodiment, the combining of the plurality of source images to produce a seamless composite image is performed without requiring overlap of image regions of the plurality of source images.

It should be appreciated that by employing the methodology described with reference to FIG. 7 the size of the view angle that can be imaged is significantly increased as compared to conventional systems because the methodology of FIG. 7 does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are employed. Consequently, greater spatial resolution can be achieved with less additional bandwidth.

Determining Position Information for a Plurality of Image Capturing Devices

A need exists to use acquisition imaging from multiple cameras to estimate the distance to elements of a scene. This is achieved through assigning correspondence to the elements when viewed from different perspectives—i.e., in different images. Correspondence is set through search, or matching, across images. Such matching is significantly facilitated when the relative orientations of the viewing cameras are known. In particular, when described by a transform called the fundamental matrix, this search can be limited to a one-dimensional region in both images. Embodiments of the present invention use the observation that the second singular value of a homology is unity to use a set of measurements across a selection of imager-to-imager configurations in estimating the epipoles and the fundamental matrices that relate imagers to each other across various viewpoints. Epipoles are the set of points defined by the intersection of the line joining the imager's center of projection and the center of projection of any other imager. In one embodiment, the fundamental matrix (F) and epipoles (e and e') are the key parameters (mathematical objects) relating two cameras for geometric calibration and scene reconstruction. The global relative position and orientation of a variety of imagers located at different positions and orientations with respect to each other are determined using these mathematical objects.

While a single planar calibration target provides a simple and effective mechanism for determining an homography relating camera geometries for image mosaicking, this is inadequate for determining other parameters, such as the fundamental matrix and epipoles. In one embodiment, these parameters can be determined through analysis of imagery from a plurality of image capturing devices observing a plurality of such planar calibration targets.

In one embodiment of the invention, two types of constants are used. The first constants are the set of "epipoles" in each image. Each such point is determined by the relative poses of the imagers and is independent of the features observed in the scene.

The second constants are the lines of intersection of various "calibration planes" (e.g., the planes containing information used in establishing the relative parameters of the imagers). In contrast to the first lines (those used in one embodiment for determining homographies), these lines are determined by the planes in the scene observed during calibration, and are independent of the relative poses of the imagers. Exploiting these constants, embodiments of the present invention unify the analysis of the imagers' relative pose and can determine position information associated with a plurality of image capturing devices.

Preliminary homographies are determined using lines projected to a planar field, and used in constructing a mosaicked video stream. Homologies are formed from these homographies, which can be decomposed as Rank-One Permutation of Identity (ROPI) matrices whose second singular values are unity. "Epipoles" are fixed points of the homologies—that is, they are not affected by application of the homology. Embodiments of the present invention provide a robust matrix normalization, which permits consideration of all planes and multiple cameras with respect to a chosen reference camera simultaneously without regard for the usual "up-to-a-scale" issue. The exploitation of this normalization process is addressed in detail in this application.

By stacking all homologies together, the epipole estimation can be solved by Singular Value Decomposition (SVD). Since embodiments of the invention use the constraints between multiple calibration planes and multiple cameras, this method is robust to noise.

Embodiments of the present invention do not depend upon camera intrinsics, so it applies to uncalibrated cameras and in situations where metric information about the planes is not available. Where metric information is available, for example in the form of coordinate values for observations on the observed planes, this information may be incorporated.

Embodiments of the invention enable multi-viewpoint and 3D imaging, and optimization techniques to exploit these image streams by delivering high quality globally optimal calibration models.

Estimation of Epipoles

In one embodiment of the invention, one of the cameras provides the frame of reference (k=0). Denoting homology matrices $^{i,j}H_k = (^iH_k)^{-1}(^jH_k)$, where i and j are plane indices (i=1, 2, ..., n−1, j=i+1, ..., n), k=1, 2, ..., K is the camera index, and $^iH_k$ is the homography determined between imager k and the chosen reference imager 0 obtained using plane with index i.

$$\begin{cases} {}^{i,j}H_1 = I_{3\times 3} + e_1^{i,j} v^T \\ \vdots \\ {}^{i,j}H_k = I_{3\times 3} + e_k^{i,j} v^T \\ \vdots \\ {}^{i,j}H_K = I_{3\times 3} + e_K^{i,j} v^T \end{cases}$$

Together, $n(n-1)K/2$ equations can be acquired, and the final objective function can be written:

$$J = \sum_{k=1}^{K} \sum_{i=1}^{n-1} \sum_{j=i+1}^{n} \| {}^{i,j}H_k - I - e_k^{i,j} v^T \|_F^2$$

where $e_k$ is the epipole in the reference camera corresponding to camera k, and ${}^{i,j}v$ is the image of the intersection of planes i and j in the reference camera. $e_k$ is only related to camera k and the reference camera, and is independent of the planes. On the other hand, ${}^{i,j}v$ is the intersection of the plane i and j and will be independent of the cameras. The formula in matrix form:

$$\begin{pmatrix} {}^{1,2}H_1-I \cdots {}^{i,j}H_1-I \cdots {}^{n-n,n}H_1-I \\ {}^{1,2}H_2-I \cdots {}^{i,j}H_2-I \cdots {}^{n-n,n}H_2-I \\ \cdots \vdots \cdots \\ {}^{1,2}H_K-I \cdots {}^{i,j}H_K-I \cdots {}^{n-n,n}H_K-I \end{pmatrix} = \begin{bmatrix} e_1 \\ e_2 \\ \vdots \\ e_K \end{bmatrix} [ {}^{1,2}v^T \quad {}^{1,3}v^T \quad \cdots \quad {}^{n-1,n}v^T ]$$

Identifying the left side of the above equation as A, each row of A corresponds to one camera. This is also an MLE (maximum likelihood estimation) or least-squares problem and different methods can be used to solve it (Levenberg-Marquard, etc.). Using SVD with $A=U\Sigma V^T$, the optimal values for $e_k$ and ${}^{i,j}v$ arise from the first singular value of the matrix A.

While $e'_k$ could be estimated $e'_k = {}^{J}H_k e_k$, in one embodiment it is derived using the method used to obtain $e_k$, that is, by inverting the homographies ${}^{i}H_k$ and ${}^{J}H_k$ in deriving the homologies.

Estimation of the Fundamental Matrix

Since $F \cong [e']_x H$, given the epipole-pair e and e', and a set of homographies, ${}^{i}H, i=1, 2, \ldots, n$, the optimal fundamental matrix (F), in the Frobenius norm sense, is $$F^* = \sum_{i=1}^{n} [e']_x {}^{i}H,$$

having rank 2. Embodiments of the present invention weight this mean using estimate confidences. F allows images to be aligned (rectified) for simple one-dimensional search in determining corresponding elements, and thus facilitates determining relative distance to the element in 3D.

Figure 8:
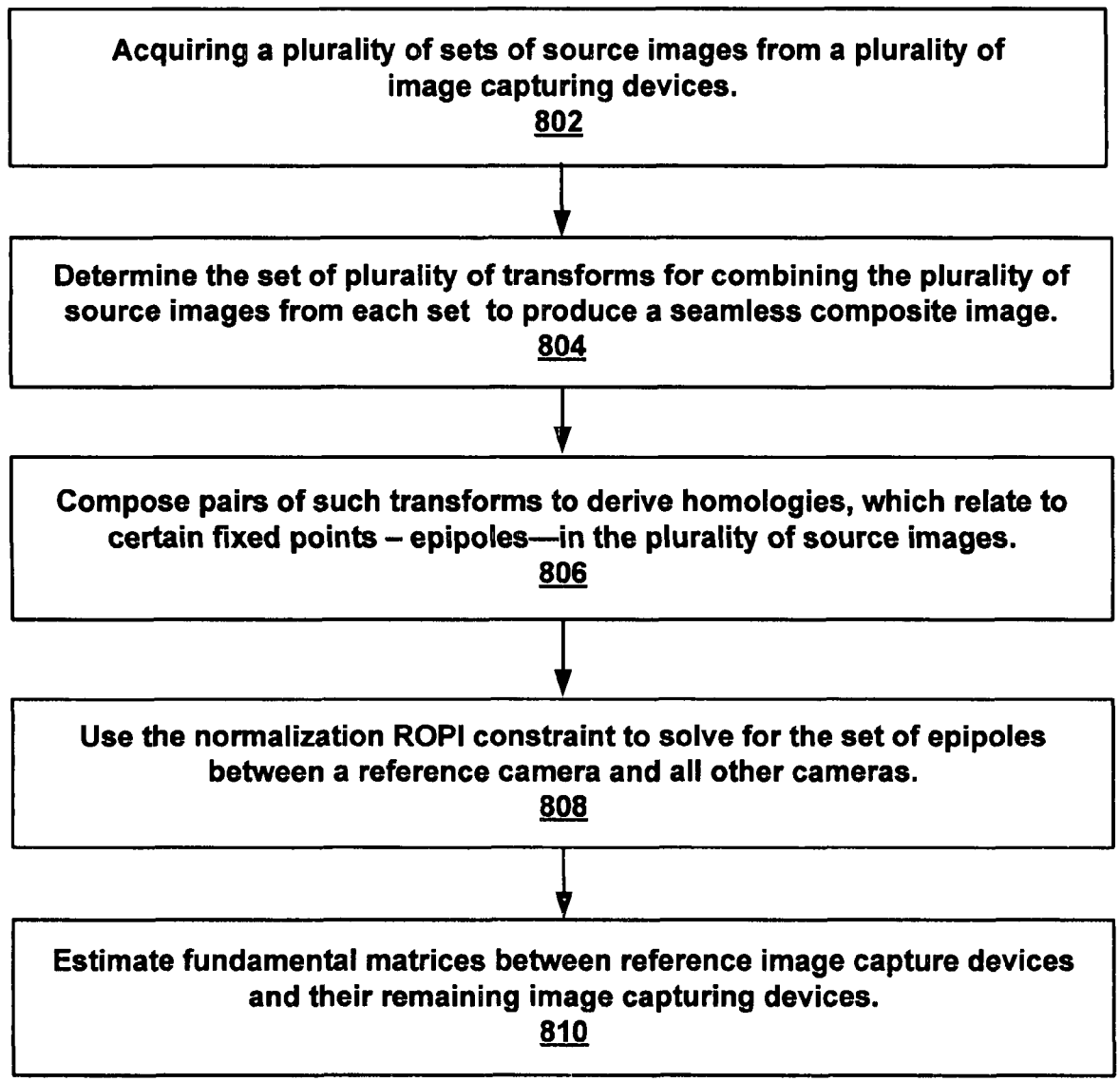
FIG. 8 is a flow diagram of an exemplary method for determining location information associated with a plurality of image capturing devices in accordance with embodiments of the present invention.

FIG. 8 is a flow diagram of an exemplary method 800 for determining location information associated with a plurality of image capturing devices in accordance with embodiments of the present invention. In one embodiment, method 800 can be used to determine spatial relationships between a plurality of image capturing devices without requiring physical measurements of the image capturing devices.

At 802, 800 includes acquiring a plurality of sets of source images from a plurality of image capturing devices.

At 804, 800 includes determining the transforms for combining the plurality of source images from each such set to produce a seamless composite image. In one embodiment, 804 is performed using line features determined from the source images acquired in 802.

At 806, 800 includes composition of pairs of corresponding transforms across sets which provides homologies that relate to epipoles and the lines of intersection ($e_k$ and ${}^{i,j}v$). These homologies may be "normalized" so that their second singular value equals 1.0. A set of such plurality of source images and normalized homologies provides a system of constraints for estimating the epipoles and associated fundamental matrices.

At 808, 800 includes determining a plurality of epipoles associated with the plurality of image capturing devices based on the acquired images. In one embodiment, 808 includes determining epipoles between one reference image capturing device and the remaining image capturing devices. In another embodiment, 808 includes determining epipoles between all image capturing devices and their remaining image capturing devices.

At 810, 800 includes determining a plurality of relative spatial relationships associated with the plurality of image capturing devices based on the plurality of epipoles and transforms associated with the plurality of image capturing devices. In one embodiment, 810 includes determining fundamental matrices between a plurality of reference image capturing devices and their remaining image capturing devices.

Figure 9:
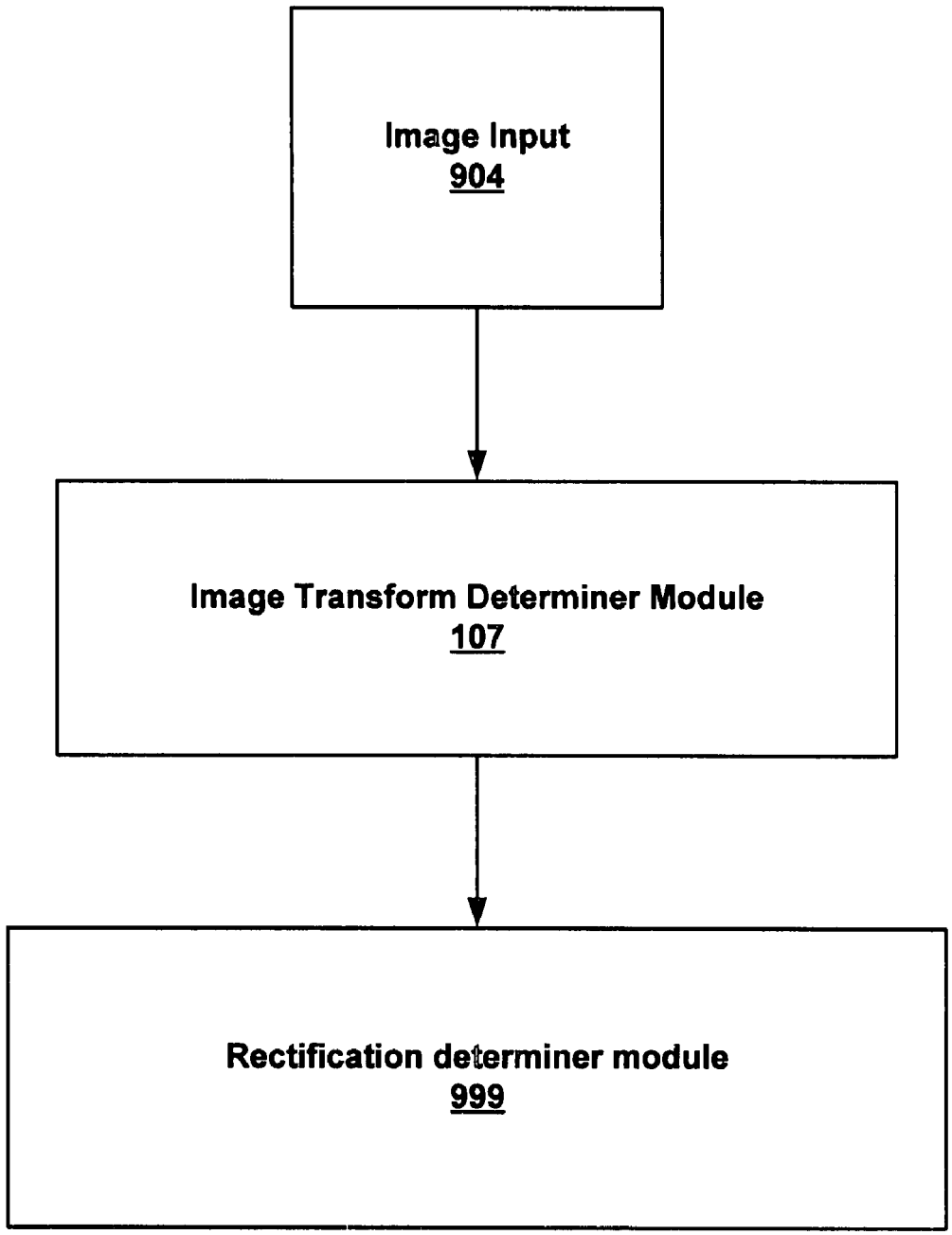
FIG. 9 is a block diagram of an exemplary system for determining position information associated with a plurality of image capturing devices in accordance with embodiments of the present invention.

FIG. 9 is a block diagram of an exemplary system 900 for determining position information associated with a plurality of image capturing devices in accordance with embodiments of the present invention.

System 900 includes image input 904 for accessing a plurality of source images from a plurality of image capturing devices.

System 900 also includes an image transform determiner module 107 that determines the transforms needed to combine the source images to produce seamless composite images (e.g., virtual images, mosaic images etc.). In one embodiment, the composite image is created in a manner that does not require overlap of an image region of the acquired image. In one embodiment, this is accomplished by using line features to combine the source images (see discussion made with reference to FIG. 3). The line features enable the image transform determiner module 107 to identify relationships that exist among the source images that can be utilized to combine the source images seamlessly.

System 900 also includes a rectification determiner module 999 for determining transforms associated with the plurality of image capturing devices that will align their content for epipolar-line matching. In one embodiment, system 900 is used to perform method 800 described above.

The proof that the second singular value of a rank one perturbation of identity (ROPI) matrix has value equal to unity is presented in FIG. 10.

Embodiments of the present invention are thus described. While the present invention has been described in particular embodiments, it should be appreciated that the present invention should not be construed as limited by such embodiments, but rather construed according to the following claims.

What is claimed is:

1. A method for determining a plurality of spatial relationships associated with a plurality of image capturing devices, comprising:

acquiring sets of a plurality of source images from a plurality of image capturing devices;

determining a plurality of transforms for each such set of source images for combining said acquired source images into a plurality of seamless images;

determining a plurality of relative positions associated with said plurality of image capturing devices based on said plurality of transforms; and determining a plurality of spatial relationships associated with said plurality of image capturing devices based on said transforms and plurality of relative positions associated with said plurality of image capturing devices.

2. The method of claim 1 wherein said determining of said plurality of transforms is performed using line features determined from source images.

3. The method of claim 1 wherein said spatial relationships comprise image transforms between said plurality of image capturing devices.

4. The method of claim 1 wherein said spatial relationships comprise epipolar rectification transforms.

5. The method of claim 1 wherein said spatial relationships comprise position and orientation information associated with said plurality of image capturing devices.

6. The method of claim 1 wherein said plurality of spatial relationships are determined without physically measuring said spatial relationships.

7. A non-transitory computer-useable medium having computer-readable program code stored thereon for causing a computer system to execute a method for determining a plurality of spatial relationships associated with a plurality of image capturing devices, said method comprising:

acquiring sets of a plurality of source images from a plurality of image capturing devices;

determining a plurality of transforms for each such set of source images for combining said acquired source images into a plurality of seamless images;

determining a plurality of relative positions associated with said plurality of image capturing devices based on said plurality of transforms; and determining a plurality of spatial relationships associated with said plurality of image capturing devices based on said transforms and plurality of relative positions associated with said plurality of image capturing devices.

8. The computer-usable medium of claim 7 wherein said determining of said plurality of transforms is performed using line features determined from said source images.

9. The computer-usable medium of claim 7 wherein said spatial relationships comprise image transforms between said plurality of image capturing devices.

10. The computer-usable medium of claim 7 wherein said spatial relationships comprise epipolar rectification transforms.

11. The computer-useable medium of claim 7 wherein said spatial relationships comprise position and orientation information associated with said plurality of image capturing devices.

12. The computer-useable medium of claim 7 wherein said plurality of spatial relationships are determined without physically measuring said spatial relationships.

13. A system for determining position relationships between a plurality of image capturing devices comprising:

an input for receiving a plurality of source images captured by said plurality of image capturing devices;

an image transform determiner module for determining the transforms needed to combine said plurality of source images to produce a seamless composite image; and a rectification determiner module coupled to said transform determiner module, said rectification determiner module configured to determine transforms associated with said plurality of image capturing devices that will align their content for epipolar-line matching.

14. The system of claim 13 wherein said seamless composite image is produced using line features determined from said source images.

* * * * *